(12) United States Patent
White

(10) Patent No.: US 10,965,125 B2
(45) Date of Patent: Mar. 30, 2021

(54) SIMULTANEOUS BIDIRECTIONAL POWER USAGE OF GENERATOR POWER FEEDERS

(71) Applicant: The Boeing Company, Chicago, IL (US)

(72) Inventor: Jeffrey J. White, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 172 days.

(21) Appl. No.: 16/032,290

(22) Filed: Jul. 11, 2018

(65) Prior Publication Data

US 2020/0021111 A1 Jan. 16, 2020

(51) Int. Cl.
*H02J 3/14* (2006.01)
*G05F 1/12* (2006.01)
*B64D 41/00* (2006.01)

(52) U.S. Cl.
CPC ............... *H02J 3/14* (2013.01); *B64D 41/00* (2013.01); *G05F 1/12* (2013.01); *B64D 2221/00* (2013.01)

(58) Field of Classification Search
CPC .. B64D 2231/02; B64D 41/00; B64D 11/003; B64D 27/26; B64D 27/24; B64D 2221/00; B64D 47/00; B64C 1/20; B64C 1/16; H02J 13/0003; H02J 3/381; H02J 4/00; H02J 2310/44; H02J 3/14; H02J 3/001; H02J 9/068; H02J 2310/40; G05F 1/12; G05F 1/10
See application file for complete search history.

(56) References Cited

U.S. PATENT DOCUMENTS

| | | | | |
|---|---|---|---|---|
| 4,967,096 A | * | 10/1990 | Diemen | F02N 11/04 290/38 R |
| 2004/0129835 A1 | * | 7/2004 | Atkey | B64D 41/00 244/118.5 |
| 2006/0044722 A1 | * | 3/2006 | Wavering | F02C 7/36 361/62 |
| 2017/0365993 A1 | * | 12/2017 | Wagner | H02P 9/305 |

OTHER PUBLICATIONS

"787 Electrical System", Boeing, available at http://787updates.newairplane.com/787-Electrical-Systems/787-electrical-system#, 2013.

* cited by examiner

*Primary Examiner* — Rexford N Barnie
*Assistant Examiner* — Terrence R Willoughby
(74) *Attorney, Agent, or Firm* — McDonnell Boehnen Hulbert & Berghoff LLP

(57) ABSTRACT

Aircraft power distribution systems and methods for regulating a system voltage in aircraft power distribution systems are described. An example system includes a first generator, a first power feeder, a second power feeder, a first load, a second load, and a plurality of contactors. The first power feeder and the second power feeder are coupled in parallel between the first generator and a power panel. The first load is coupled to the first power feeder, and the second load is coupled to the second power feeder. The plurality of contactors is configurable to transfer power in a first direction from the first generator to both the first load and the second load during a first mode of operation, and configurable to transfer power in a second direction from the power panel to the first load or the second load during a second mode of operation.

20 Claims, 15 Drawing Sheets

SIMULTANEOUS BIDIRECTIONAL POWER USAGE OF GENERATOR POWER FEEDERS

FIELD

The present disclosure relates generally to electrical systems, and more particularly, to aircraft power distribution systems and methods for regulating a system voltage in an aircraft power distribution system.

BACKGROUND

An aircraft's electrical system can produce, control, and distribute power to other systems, such as wing ice protection systems (WIPSs), flight deck displays, flight controls, in-flight entertainment systems, and galley complexes. Some aircrafts include multiple generators that generate electricity. For instance, an airplane with two engines can include one generator on each of the two engines as well as a third generator that is part of an auxiliary power unit (APU). The third generator is sometimes referred to as an APU generator. When the airplane is on the ground, an aircraft battery can start the APU so that the APU generator can then provide power to the aircraft buses. In flight, the engine generators are typically the primary sources of electrical power.

FIG. 1 shows a block diagram of an aircraft power distribution system 100 having a left generator 102, a right generator 104, and an APU generator 106. Power is transferred from APU generator 106 to a power panel 108 by way of APU power feeder 110. Power panel 108 can be located in a front electrical equipment bay while the APU generator 106 can be located in the tail of the aircraft. Further, power is transferred from left generator 102 to a left alternating current (AC) bus 112 by way of left power feeder 114. Similarly, power is transferred from right generator 104 to a right AC bus 116 by way of right power feeder 118. Power at left AC bus 112 could be 115 Volts AC (VAC) or 230 VAC. Similarly, power at right AC bus 116 could be 115 VAC or 230 VAC.

FIG. 2 shows a schematic diagram 200 of an implementation of the aircraft power distribution system 100 of FIG. 1. In FIG. 2, first load 120 includes first WIPS heater blankets 202 controlled by a first WIPS control unit 204. Further, second load 128 includes second WIPS heater blankets 206 controlled by a second WIPS control unit 208. Power flows in only one direction, i.e. from APU generator 106 to power panel 108, on APU power feeder 110. Power then flows from power panel 108 to left AC bus 112 and right AC bus 116, which in turn feed power to first WIPS control unit 204 and second WIPS control unit 208. Further, first load power feeder 122 is routed from a front electrical equipment bay 210 back to first WIPS heater blankets 202, and second load power feeder 130 is routed from the front electrical equipment bay back to second WIPS heater blankets 206. Front electrical equipment bay 210 can, for example, be located under a cockpit of an aircraft and/or under a cabin intended for passengers or cargo.

FIG. 3 shows a conceptual illustration 300 of a technique for regulating a system voltage in the aircraft power distribution system 100 of FIG. 1. As shown in FIG. 3, a control unit 302 senses a voltage at a point of regulation (POR) 304. POR 304 is located at power panel 108. In practice, control unit 302 can supply a direct current (DC) voltage to an exciter field of APU generator 106 to regulate the system voltage at a steady state value (e.g., 230 Volts root mean square (Vrms)). As the load at POR 304 varies, control unit 302 can adjust the DC voltage supplied to the exciter field, causing the power output by APU generator to increase or decrease, thereby helping to maintain a relatively constant voltage at power panel 108.

SUMMARY

In one example, an aircraft power distribution system is described. The aircraft power distribution system includes a first generator, a first power feeder, a second power feeder, a first load, a second load, and a plurality of contactors. The first power feeder is coupled between the first generator and a power panel. The second power feeder is coupled between the first generator and the power panel, and is coupled in parallel with the first power feeder. The first load is coupled to the first power feeder, and the second load is coupled to the second power feeder. Each contactor of the plurality of contactors is connected to at least one of the first power feeder and the second power feeder. Further, the plurality of contactors is configurable to transfer power in a first direction from the first generator to both the first load and the second load during a first mode of operation, and configurable to transfer power in a second direction from the power panel to the first load or the second load during a second mode of operation.

In another example, a control system for regulating a system voltage in an aircraft power distribution system is described. The control system includes first sensing equipment, second sensing equipment, and a control unit. The first sensing equipment is configured to sense a first voltage at a first node, the first node being a load coupled to a power feeder between a generator and a power panel. The second sensing equipment is configured to sense a second voltage at a second node that is separate from the first node. The control unit is configured to select either the first node or the second node as a point of regulation, determine a target voltage at the point of regulation, and regulate the system voltage based on the target voltage.

In another example, a method for regulating a system voltage in an aircraft power distribution system is described. The method includes determining, by a control unit, whether or not a load is in use, the load being coupled to a power feeder between a first generator and a power panel. The method also include selecting, by the control unit based on whether or not the load is in use, either a first node or a second node as a point of regulation, the first node being the load, and the second node being separate from the first node. Further, the method includes determining, by the control unit, a target voltage at the point of regulation, and regulating, by the control unit, the system voltage at the point of regulation based on the target voltage.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are aircraft power distribution systems and methods for regulating a system voltage in aircraft power distribution systems. In an example aircraft power distribution system, parallel power feeders can be utilized in multiple modes of operation which allow for power flow in one of two directions. Optionally, power can flow in a first direction in a first power feeder while, at the same time, power flows in a second, parallel power feeder in a second direction that is opposite to the first direction. In contrast, conventional aircraft power distribution systems, such as aircraft power distribution system 100 shown in FIGS. 1 and 2, only allow power to flow on power feeders in one direction at any time.

Figure 1:
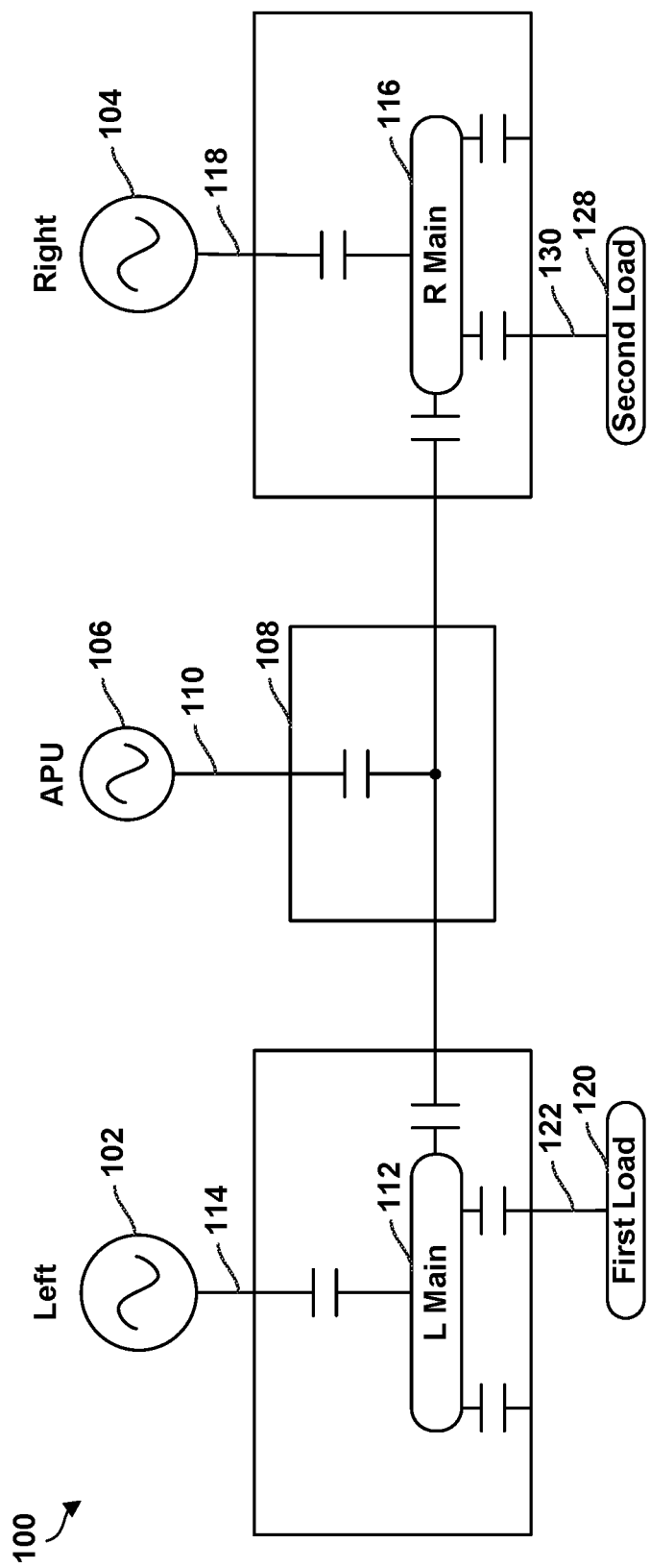
FIG. 1 shows a block diagram of an aircraft power distribution system.
Figure 2:
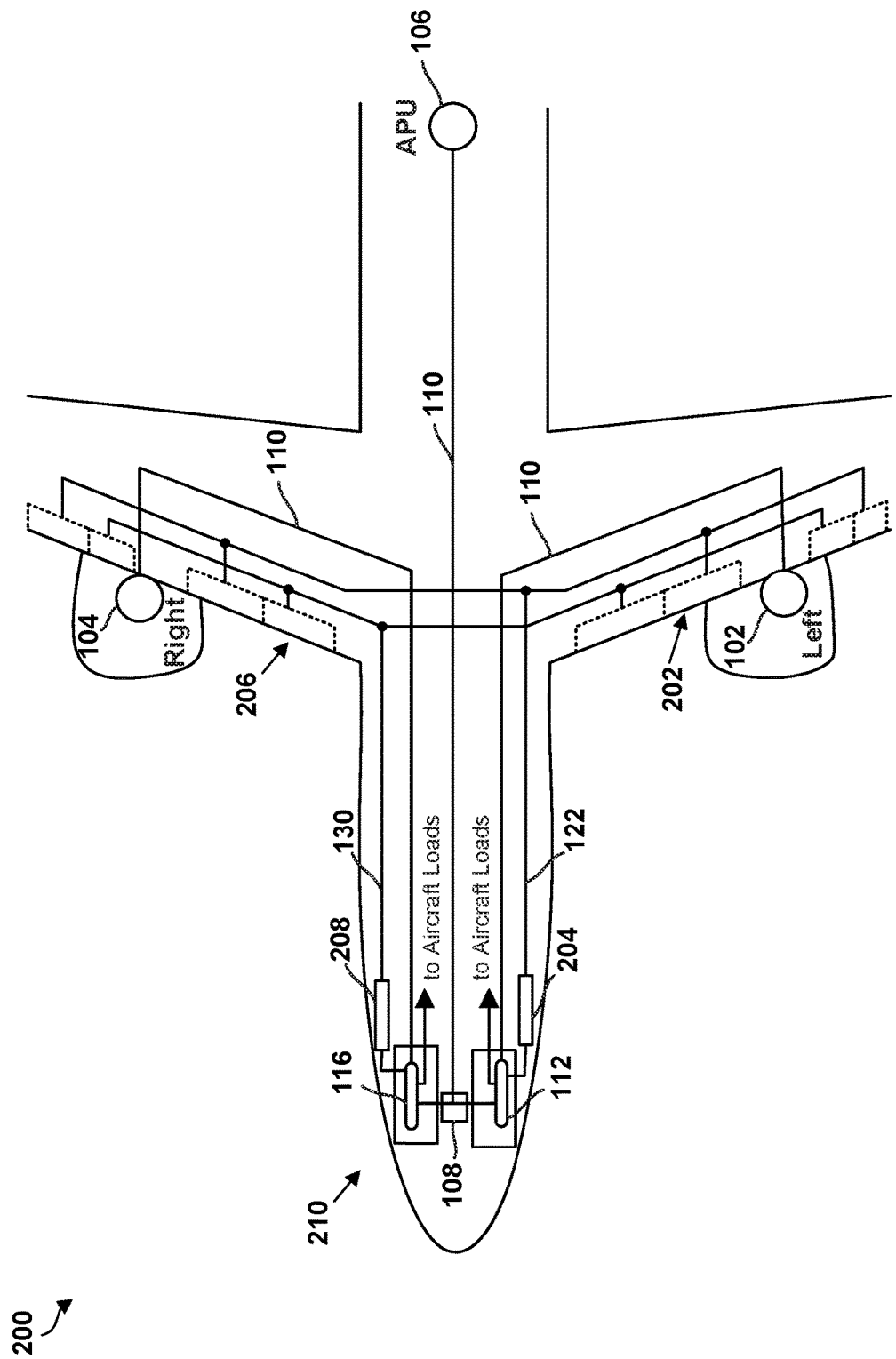
FIG. 2 shows a schematic diagram of an implementation of the aircraft power distribution system of FIG. 1.
Figure 3:
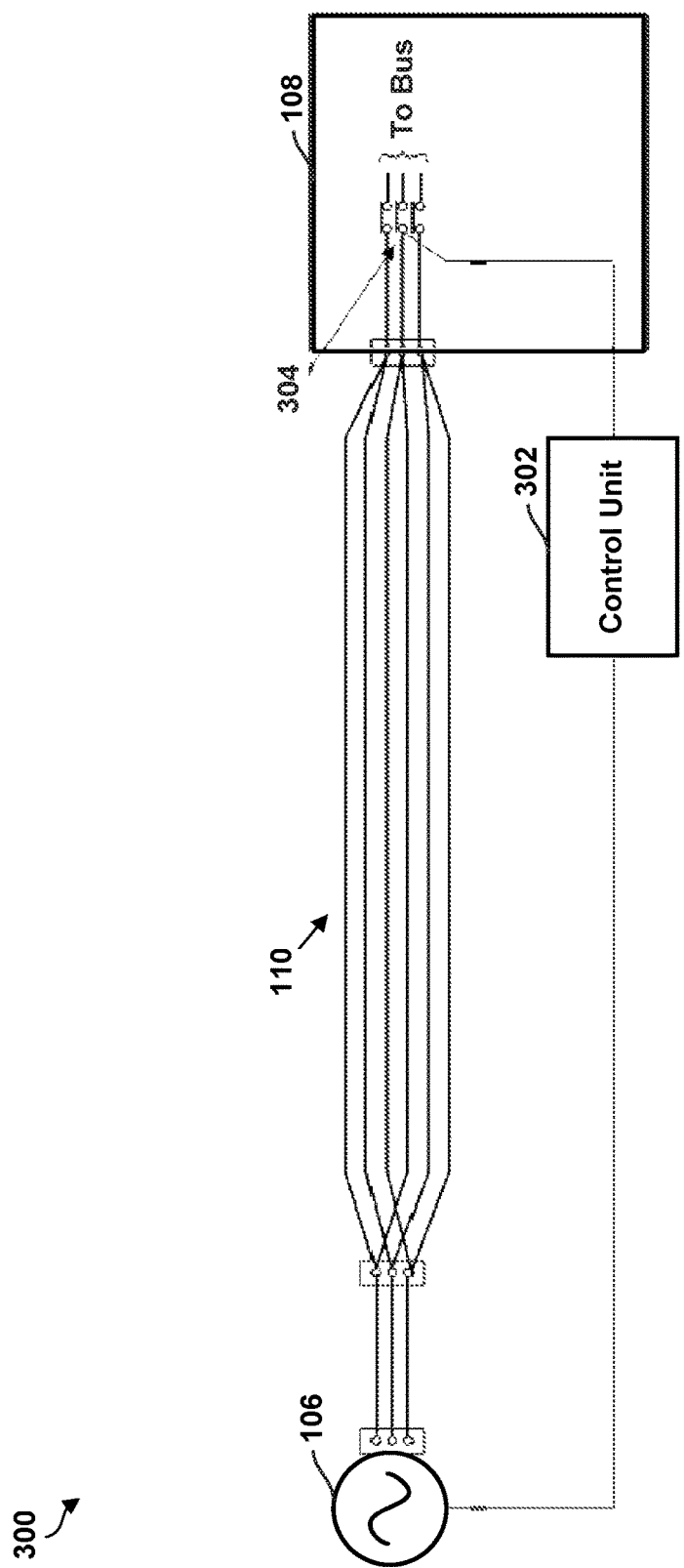
FIG. 3 shows a conceptual illustration of a technique for regulating a system voltage in the aircraft power distribution system of FIG. 1.

Moreover, with the aircraft power distribution systems described herein, one or more loads can be powered at a node located between an APU and a power panel, such as a power panel located in a front electrical equipment bay of an aircraft. With this approach, the aircraft power distribution system can be lighter, more cost-effective, and easier to install than existing aircraft power distribution systems. For instance, existing aircraft power distribution systems have dedicated power feeders running from power panels located in the front of an aircraft to each load location. First load power feeder 122 and second load power feeder 130 of FIGS. 1 and 2 are an example of these dedicated power feeders. For large loads, such as galley complexes or WIPSs, these power feeders are heavy and require significant manufacturing time to install. Advantageously, powering one or more loads at a node located between the APU and the power panel eliminates the need for a significant portion of these dedicated power feeders, yielding weight, cost, and manufacturing time savings.

With regard to regulating system voltage, control systems that enable a point of regulation (POR) to be switched between a first node and a second node are described. A POR is a point at which a power source senses and regulates a system voltage. An example control system includes first sensing equipment, second sensing equipment, and a control unit. The first sensing equipment can be configured to sense a first voltage at a first node. For instance, the first node can be a load coupled to a power feeder between a generator and a power panel. The second sensing equipment can be configured to sense a second voltage at a second node that is separate from the first node, such as at the power panel. Further, the control unit can then be programmed to select either the first node or the second node as the POR, determine a target voltage at the POR, and regulate the system voltage at the POR based on the target voltage.

As an example, when a load powered at the first node is not being utilized, the control unit can select the second node as the POR, and adjust an output current or power of the generator based on a target voltage and a voltage sensed at the second node. Whereas, when the load powered at the first node is being utilized, the control unit can shift the POR to the first node, and adjust the output current or power of the generator accordingly.

Various other features of these systems and methods are described hereinafter with reference to the accompanying figures.

Figure 4:
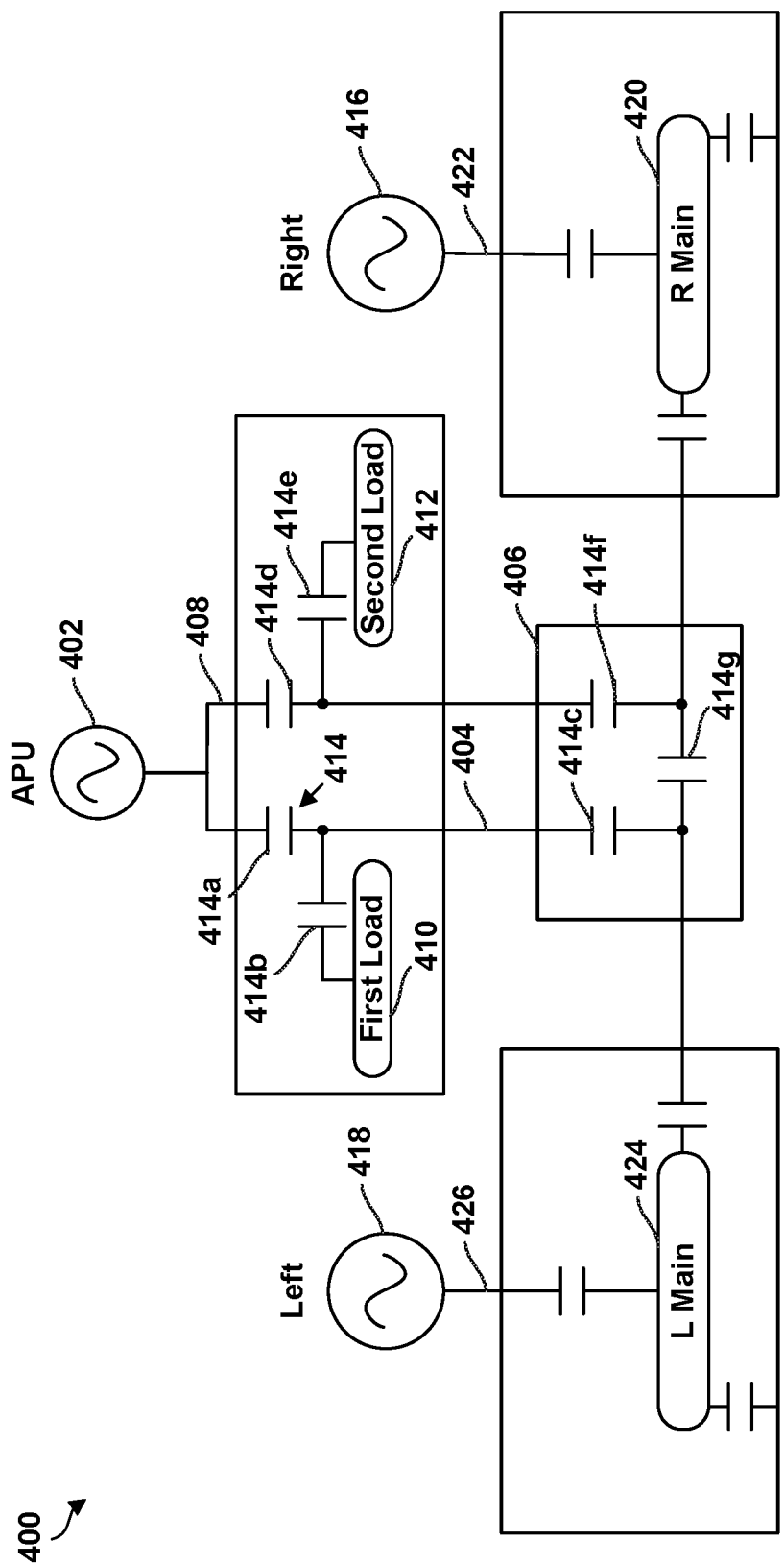
FIG. 4 shows a block diagram of an aircraft power distribution system, according to an example.

Referring now to FIG. 4, FIG. 4 shows a block diagram of an example aircraft power distribution system 400. Aircraft power distribution system 400 can distribute power to various electrical systems of an aircraft (not shown). Aircraft power distribution system 400 includes a first generator 402, a first power feeder 404 coupled between first generator 402 and a power panel 406. Further, aircraft power distribution system includes a second power feeder 408 coupled between first generator 402 and power panel 406, second power feeder 408 being coupled in parallel with first power feeder 404.

As shown in FIG. 4, first generator 402 can be an APU generator that is part of an APU. First generator 402 can provide three-phase power. For instance, first generator can provide about 230 VAC. First power feeder 404 can include three discrete, insulated cables wrapped around a neutral cable, forming a bundle. The bundle of four cables can be enclosed in a sheath of braided metallic material, and the braided metallic material can, in turn, be covered by a sheath of insulating material. Similarly, second power feeder 408 can include three discrete, insulated cables wrapped around a neutral cable. The neutral cable could be the neutral cable of first power feeder 404. In other words, first power feeder 404 and second power feeder 408 could be bundled together in the same bundle. Alternatively, second power feeder 408 could be bundled separately from first power feeder 404 and second power feeder 408 could include a separate neutral cable. Optionally, first power feeder 404 and second power feeder 408 could be bundled together for one or more portions of a run between first generator 402 and power panel 406, and also bundled separately at other portions of the run.

Power panel 406 can include one or more buses and one or more circuit breakers. Power panel 406 can be located in a front electrical equipment bay of an aircraft. Alternatively, power panel 406 can be located in another location of an aircraft.

As further shown in FIG. 4, aircraft power distribution system 400 can further include a first load 410, a second load 412, and a plurality of contactors 414. First load 410 can include a WIPS, an aft power distribution system (APDS), or another electrical system of an aircraft. Similarly, second load 412 can include a WIPS, an aft power distribution system, or another electrical system of an aircraft.

Each contactor of plurality of contactors 414 can be an electrically-controlled switch used for switching an electrical power circuit. Some contactors of plurality of contactors 414 are connected to first power feeder 404. For instance, plurality of contactors 414 includes a power-feeder isolator 414a positioned between first generator 402 and first load 410, as well as a load isolator 414b positioned between first power feeder 404 and first load 410. Plurality of contactors 414 also includes a power-panel isolator 414c coupled to first power feeder 404 and positioned at power panel 406.

Other contactors of plurality of contactors 414 are connected to second power feeder 408. For instance, plurality of contactors 414 includes a power-feeder isolator 414d positioned between first generator 402 and second load 412, as well as a load isolator 414e positioned between second power feeder 408 and second load 412. Further, plurality of contactors 414 includes a power-panel isolator 414f coupled to second power feeder 408 and positioned at power panel 406. Still further, plurality of contactors 414 includes a power-panel isolator 414g connected between first power feeder 404 and second power feeder 408.

Plurality of contactors 414 is configurable so as to provide multiple modes of operation. As an example, plurality of contactors 414 is configurable to transfer power in a first direction from first generator 402 to both first load 410 and second load 412 during a first mode of operation. As another example, plurality of contactors 414 is configurable to transfer power in a second direction from power panel 406 to first load 410 or second load 412 during a second mode of operation. The first and second modes of operation, as well as other modes of operation are described more fully below with reference to additional figures.

A computing device (not shown) can cause aircraft power distribution system 400 to operate in a particular mode by configuring the states of individual contactors of plurality of contactors 414. For instance, to place aircraft power distribution system 400 in a particular mode, the computing device can send a signal to one or more contactors of plurality of contactors 414, with reception of the signal causing the one or more contactors to open or close. A mapping database can store mapping data that maps (i) states of contactors of plurality of contactors 414 with (ii) modes of operation. When a particular mode is desired, the computing device can use the mapping data to determine states for the plurality of contactors 414, and cause one or more contactors of plurality of contactors 414 to switch from open to closed or to switch from closed to open.

Aircraft power distribution system 400 can further include a second generator 416 and a third generator 418. Second generator 416 can be a fixed or variable frequency generator located on a first engine (not shown) of the aircraft. Third generator 418 can be a fixed or variable frequency generator located on a second engine (not shown) of the aircraft. Power can be transferred from second generator 416 to a first AC bus 420 by way of power feeders 422. Similarly, power can be transferred from third generator 418 to a second AC bus 424 by way of power feeders 426.

Second generator 416 can supply power at 230 VAC or 115 VAC. Similarly, third generator 418 can supply power at 230 VAC or 115 VAC. Additionally, power at first AC bus 420 can be converted by transformer to a lower voltage. Similarly, power at second AC bus 424 can be converted by a transformer to a lower voltage. Thus, power at first AC bus 420 and power at second AC bus 424 can be 230 VAC and/or 115 VAC.

Figure 5:
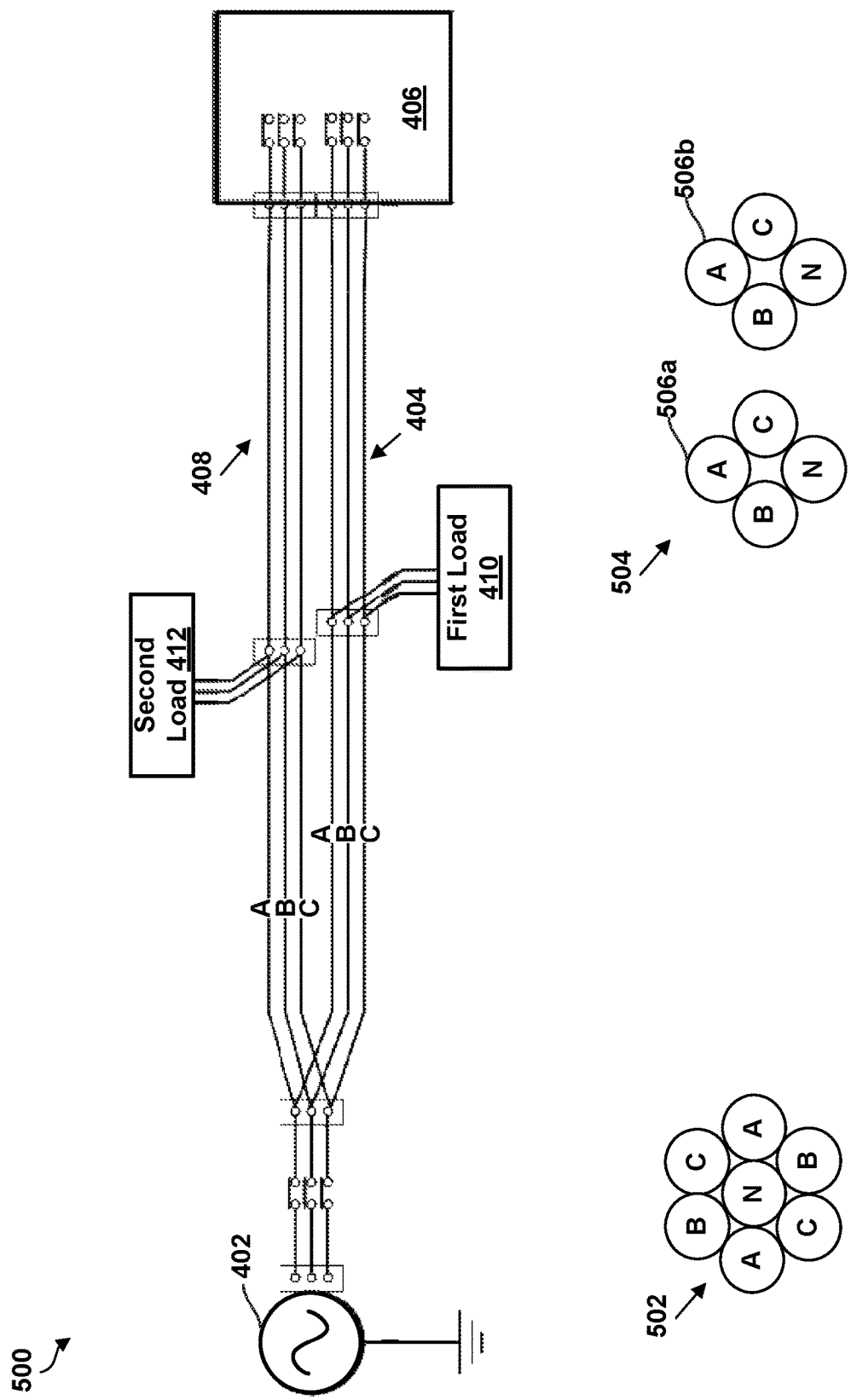
FIG. 5 shows a schematic diagram of the first power feeder and the second power feeder of the aircraft power distribution system of FIG. 4, according to an example.

FIG. 5 shows a schematic diagram 500 of first power feeder 404 and the second power feeder 408 of aircraft power distribution system 400 of FIG. 4, according to an example. As shown in FIG. 5, first power feeder 404 and second power feeder 408 provide power from first generator 402 to power panel 406. Further, each of first power feeder 404 and second power feeder 408 includes three conductors, with each conductor labeled "A", "B", or "C".

In one example, the conductors of first power feeder 404 and the conductors of second power feeder 408 can be bundled together around a neutral conductor in a star arrangement 502. Alternatively, in another example, the conductors of first power feeder 404 and the conductors of second power feeder 408 can be arranged in a double diamond geometry 504. In double diamond geometry 504, the conductors of first power feeder 404 are bundled together with a first neutral conductor in a first diamond 506a and the conductors of second power feeder 408 are bundled together with a second neutral conductor in a second diamond 506b. With star arrangement 502, when power is running in a first direction within conductors of first power feeder 404 and power is running in a second, opposite direction within conductors of second power feeder 408, frequency coupling due to magnetic fields can occur between conductors of first power feeder 404 and conductors of second power feeder 408. Double diamond geometry 504 can prevent such frequency coupling.

In line with the discussion above, first load 410 can be coupled to first power feeder 404 at a position between first generator 402 and power panel 406. Similarly, second load 412 can be coupled to second power feeder 408 at a position between first generator 402 and power panel 406.

Figure 6:
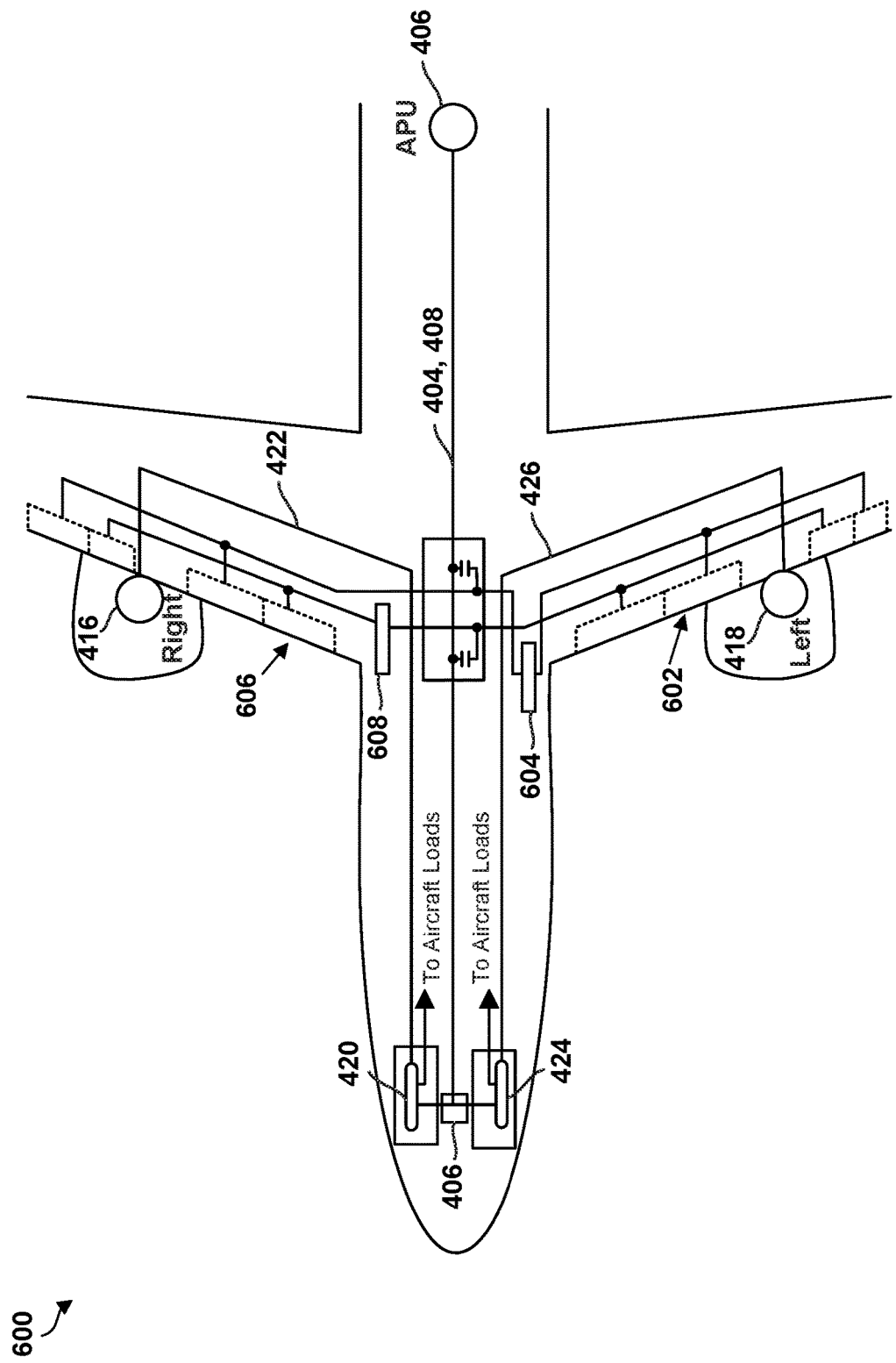
FIG. 6 shows a schematic diagram of an implementation of the aircraft power distribution system of FIG. 4, according to an example.

FIG. 6 shows a schematic diagram 600 of an example implementation of aircraft power distribution system 400 of FIG. 4. As shown in FIG. 6, first load 410 of FIG. 4 can be a first WIPS 602 that is controlled by a WIPS control unit 604. Further, second load 412 of FIG. 4 can be a second WIPS 606 controlled by a second WIPS control unit 608.

FIG. 6 further shows that power can be supplied to first WIPS 602 and second WIPS 606 by way of first power feeder 404 and second power feeder 408. With this arrangement, separate power feeders running from first AC bus 420 to first WIPS 602 and/or from second AC bus 424 to second WIPS 606 can be eliminated. Note that the conventional aircraft power distribution system 100 shown in FIG. 2 includes first load power feeder 122 and second load power feeder 130. Whereas, with the example implementation shown in FIG. 6, those power feeders are omitted.

Figure 7:
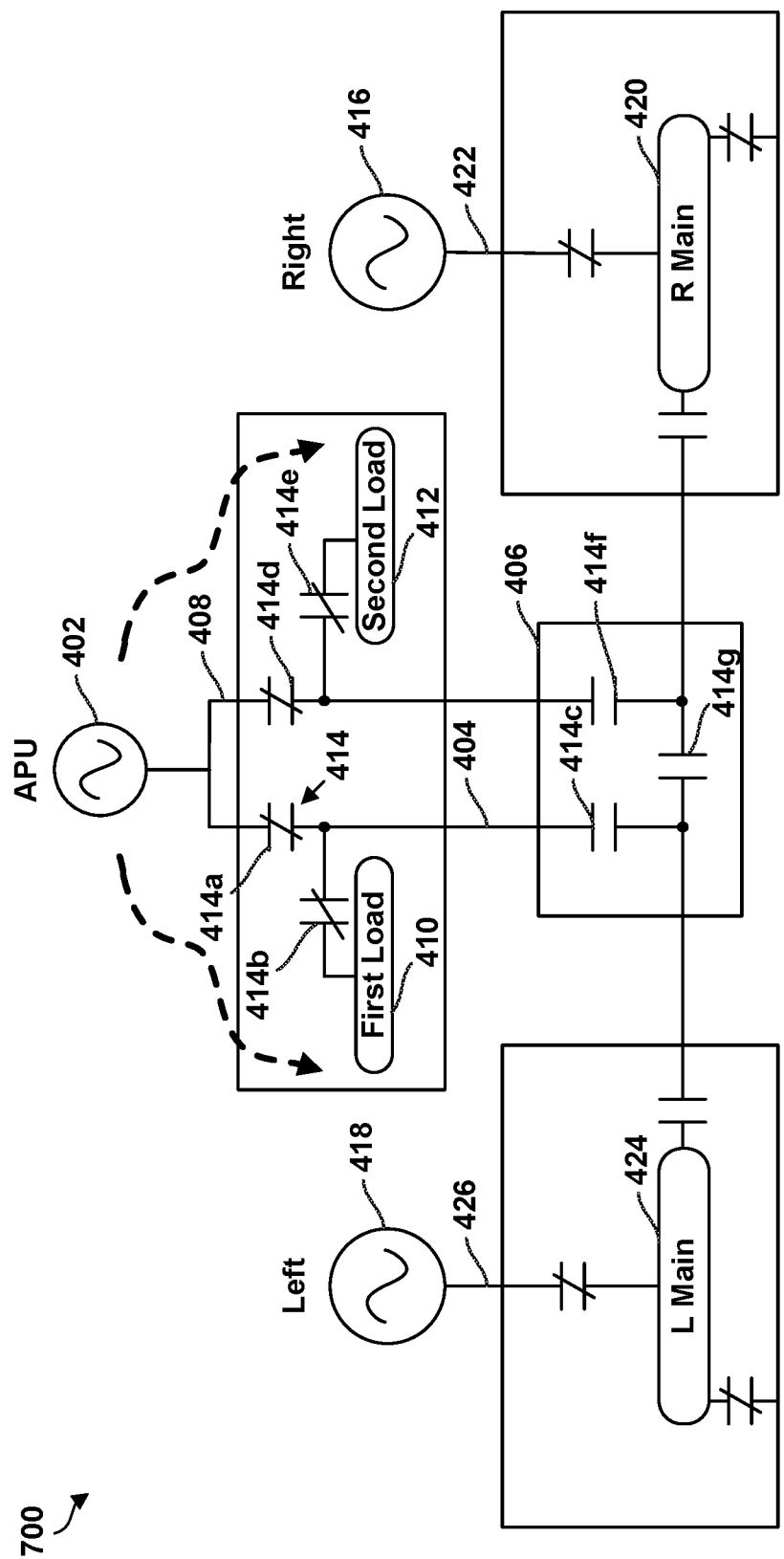
FIG. 7 shows a conceptual illustration of a first mode of operation in the aircraft power distribution system of FIG. 4, according to an example.

FIG. 7 shows a conceptual illustration 700 of a first mode of operation in the aircraft power distribution system 400 of FIG. 4, according to an example. In the first mode of operation, plurality of contactors 414 is configured to transfer power in a first direction from first generator 402 to both first load 410 and second load 412. More specifically, in the first mode of operation, power-feeder isolator 414a, load isolator 414b, power-feeder isolator 414d, and load isolator 414e are closed. Further, power-panel isolator 414c, power-panel isolator 414f, and power-panel isolator 414g are open. The power flows are represented in FIG. 7 by the bold, dotted lines.

Figure 8:
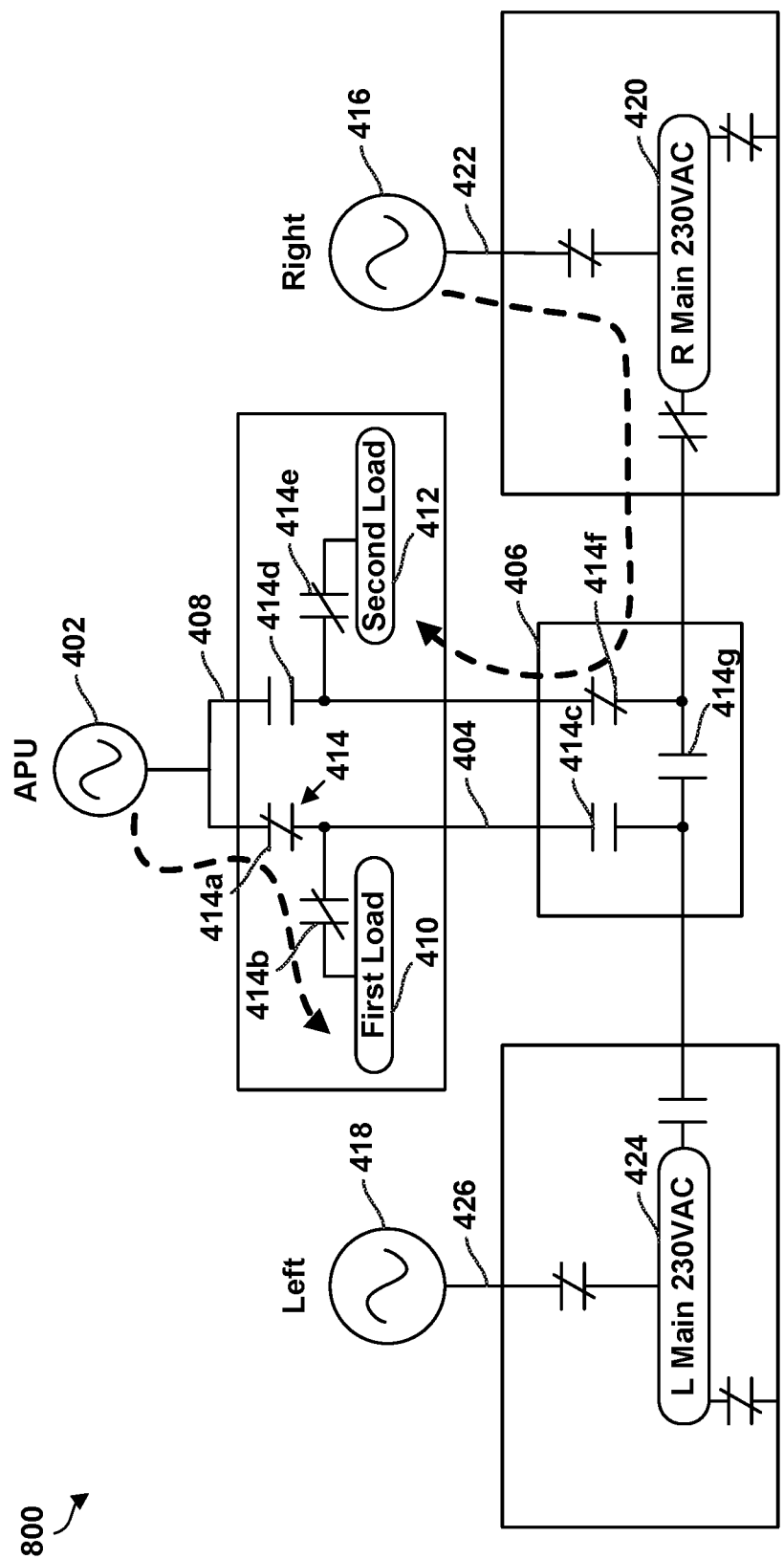
FIG. 8 shows a conceptual illustration of a second mode of operation in the aircraft power distribution system of FIG. 4, according to an example.

FIG. 8 shows a conceptual illustration 800 of a second mode of operation in the aircraft power distribution system 400 of FIG. 4, according to an example. In the second mode of operation shown in FIG. 8, plurality of contactors 414 is configured to simultaneously transfer power in a first direction from first generator 402 to first load 410 and transfer power in a second direction from second generator 416 to second load 412 by way of power panel 406. More specifically, in the second mode of operation, power-feeder isolator 414a, load isolator 414b, load isolator 414e, and power-panel isolator 414f are closed. Further, power-panel isolator 414c, power-feeder isolator 414d, and power-panel isolator 414g are open. The power flows are represented in FIG. 8 by the bold, dotted lines.

Figure 9:
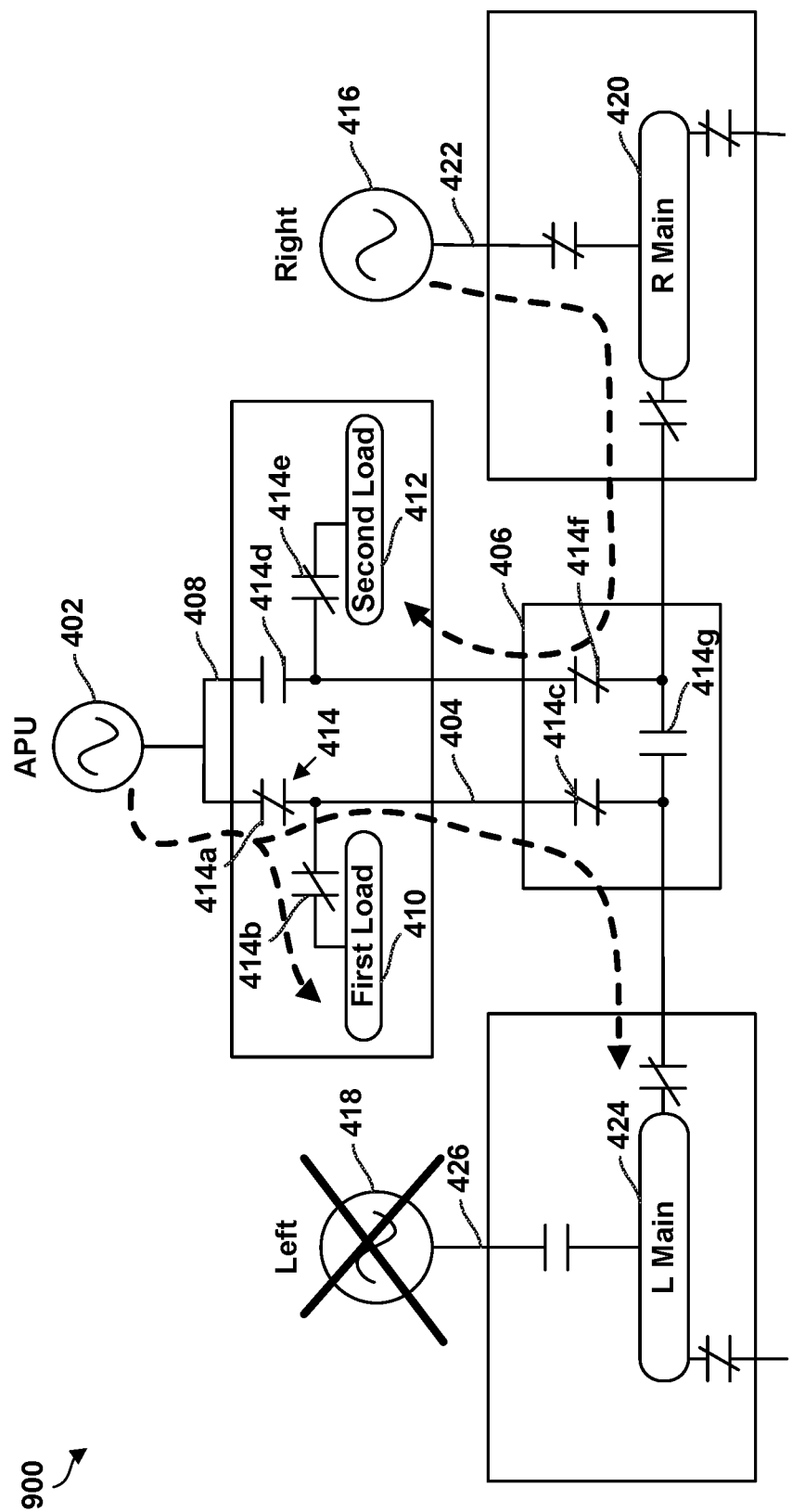
FIG. 9 shows another conceptual illustration of the second mode of operation in the aircraft power distribution system of FIG. 4, according to an example.

FIG. 9 shows another conceptual illustration 900 of the second mode of operation in aircraft power distribution system 400 of FIG. 4, according to an example. Conceptual illustration 900 differs from conceptual illustration 800 of FIG. 8 in that power-panel isolator 414c is closed in conceptual illustration 900 but power-panel isolator 414c is open in conceptual illustration 800. With the arrangement of FIG. 9, power flows in a first direction from first generator 402 to first load and also to second AC bus 424. Conceptual illustration 900 may be applicable when third generator 418 experiences an operational anomaly.

Figure 10:
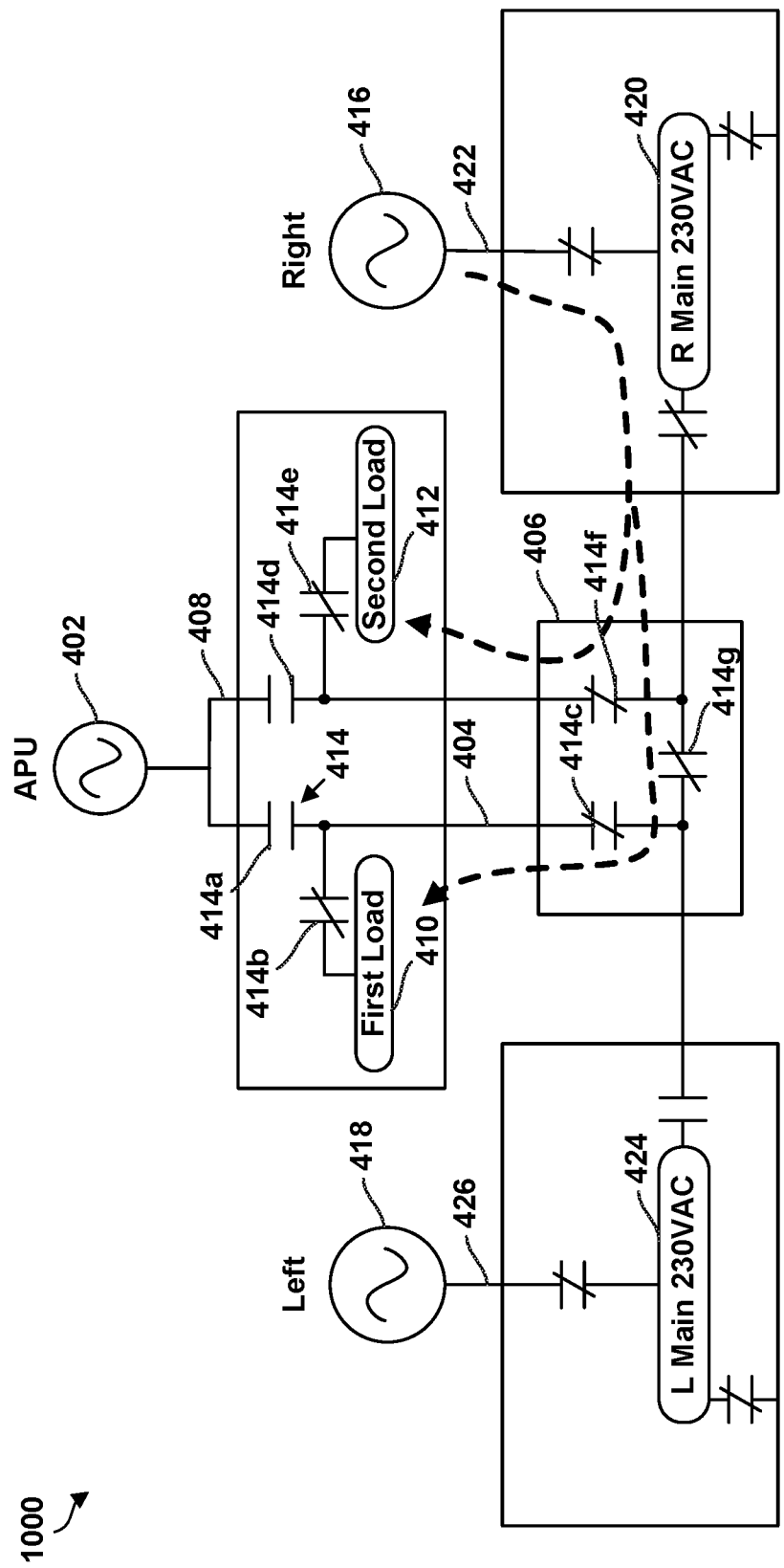
FIG. 10 shows a conceptual illustration of a third mode of operation in the aircraft power distribution system of FIG. 4, according to an example.

FIG. 10 shows a conceptual illustration of a third mode of operation in aircraft power distribution system 400 of FIG. 4, according to an example. In the third mode of operation shown in FIG. 10, plurality of contactors 414 is configured to transfer power from second generator 416 to both first load 410 and second load 412 by way of power panel 406. More specifically, in the third mode of operation, power-feeder isolator 414a and power-feeder isolator 414d are open, while load isolator 414b, load isolator 414e, power-panel isolator 414c, power-panel isolator 414f, and power-panel isolator 414g are closed. The power flows are represented in FIG. 10 by the bold, dotted lines.

Figure 11:
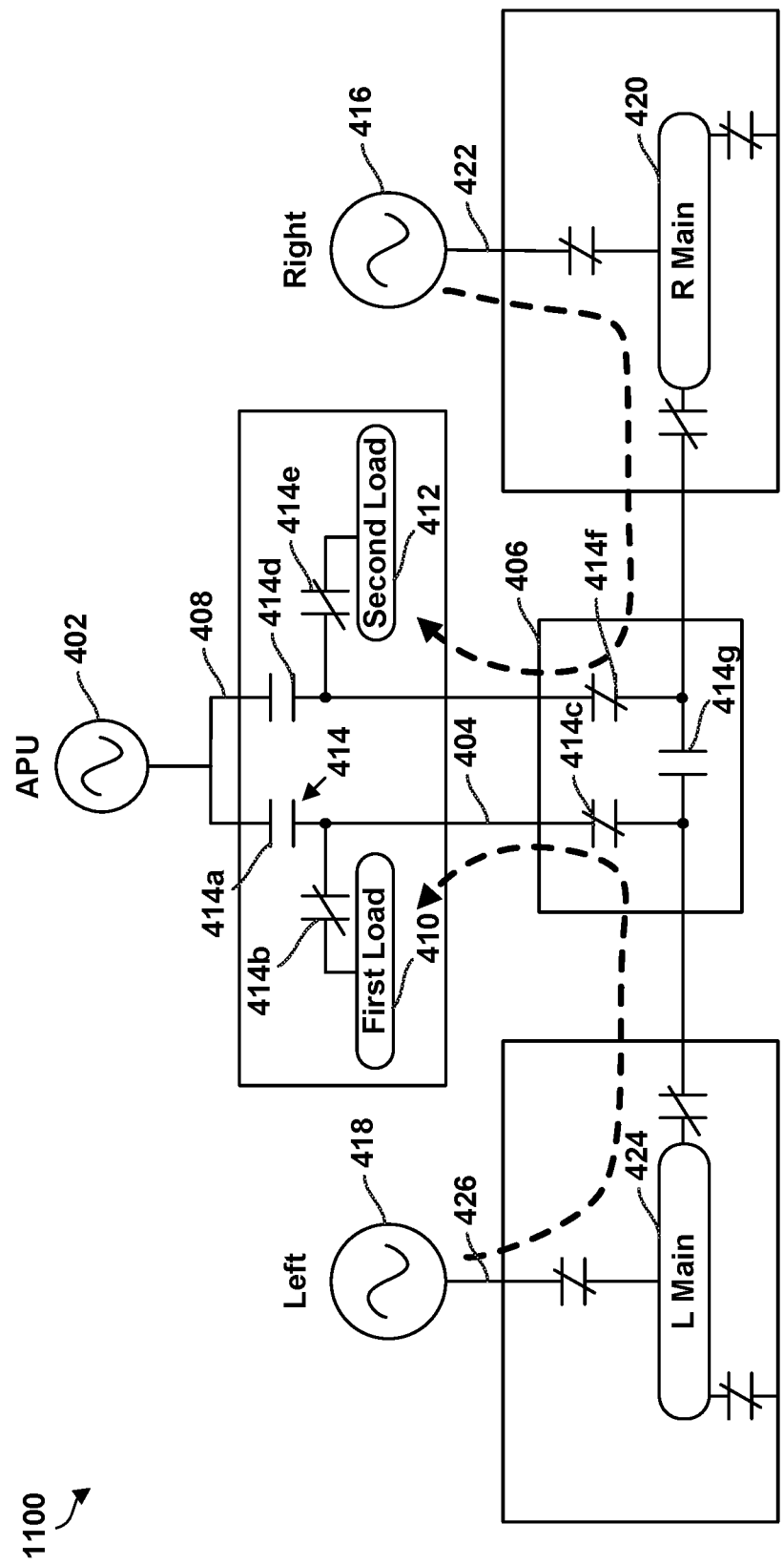
FIG. 11 shows another conceptual illustration of the third mode of operation in the aircraft power distribution system of FIG. 4, according to an example.

FIG. 11 shows another conceptual illustration of the third mode of operation in aircraft power distribution system 400 of FIG. 4, according to an example. Conceptual illustration 1100 differs from conceptual illustration 1000 of FIG. 10 in that power-panel isolator 414g is open in conceptual illustration 1100 but power-panel isolator 414g is closed in conceptual illustration 1000. With the arrangement shown in FIG. 11, power flows from second generator 416 to second load 412 by way of power panel 406, and power flows from third generator 418 to first load 410 by way of power panel 406.

Figure 12:
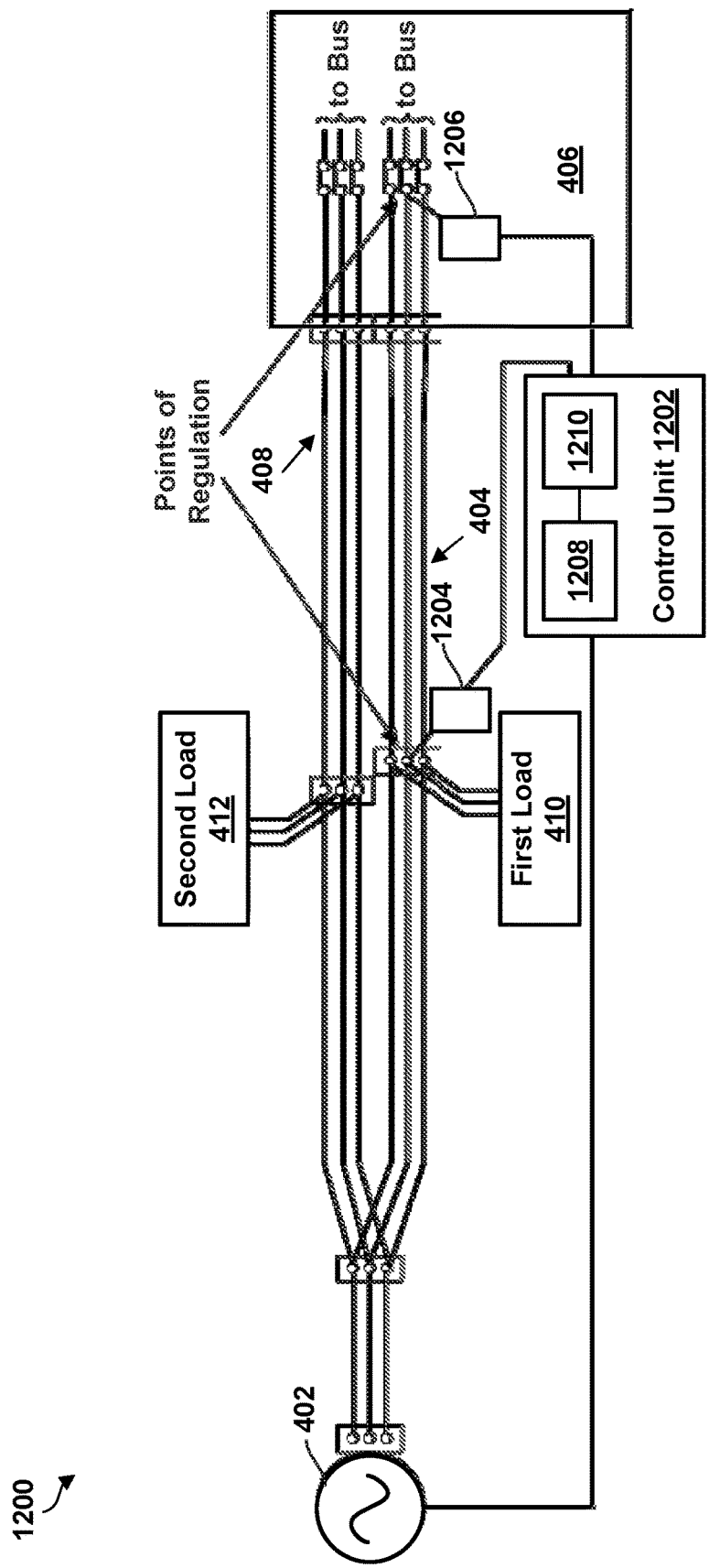
FIG. 12 shows a conceptual illustration of a technique for regulating a system voltage in the aircraft power distribution system of FIG. 4, according to an example.

FIG. 12 shows a conceptual illustration 1200 of a technique for regulating a system voltage in aircraft power distribution system 400 of FIG. 4, according to an example. In line with the discussion above, aircraft power distribution system 400 can further include a control unit 1202, first sensing equipment 1204, and second sensing equipment 1206.

Control unit 1202 can include a processor 1208 and a non-transitory computer-readable medium 1210 storing program instructions that are executable by processor 1208 to carry out any of the control unit functions described herein. The processor could be any type of processor, such as a microprocessor, digital signal processor, multicore processor, etc. Alternatively, control unit 1202 could include a group of processors that are configured to execute the program instructions, or multiple groups of processors that are configured to execute respective program instructions. In one example, control unit 1202 can be a generator control unit that includes a voltage regulator and system control logic (for fault protection, bus switching, communications, and/or built-in test equipment). Alternatively, control unit 1202 can be a voltage regulator.

First sensing equipment 1204 can include a current sensor and/or a voltage sensor. Similarly, second sensing equipment 1206 can include a current sensor and/or a voltage sensor.

Control unit 1202 can be configured to select either first load 410 or power panel 406 as a POR, and regulate a system voltage at the POR based on a target voltage. Control unit 1202 can select the POR in various ways. As one example, selecting the POR can involve determining a state of one or more contactors of plurality of contactors 414, and selecting the POR based on the state of the one or more contactors. For instance, control unit 1202 can store data that indicates current states of contactors and can store mapping data that maps (i) states of contactors of plurality of contactors 414 with (ii) PORs. Control unit 1202 can determine the current states of multiple contactors by referring to the current state data, and then use the mapping data to correlate the states to a POR.

Similarly, control unit 1202 can select the POR based on whether or not a load is in use. Determining whether or not a load is in use can involve determining a state of a load isolator of plurality of contactors 414, such as load isolator 414b. When load isolator 414b is closed, control unit 1202 can interpret the state of load isolator 414b to mean that first load 410 is in use. Whereas, when load isolator 414b is open, control unit 1202 can interpret the state of load isolator 414b to mean that first load 410 is not in use. Control unit 1202 could also determine whether or not a load is in use based on the states of multiple contactors of plurality of contactors 414. In one example, when first load 410 is in use, control unit can select first load 410 as the POR, but when first load 410 is not in use, control unit 1202 can select another node, such as power panel 406, as the POR.

As another example of selecting a POR, control unit 1202 can select the POR based on which direction current or power is flowing in a power feeder. For example, control unit 1202 can use first sensing equipment 1204 and/or second sensing equipment 1206 to determine which direction current or power is flowing in first power feeder 404. Further, control unit 1202 can then select the POR based on the direction that current or power is flowing in first power feeder 404. For instance, if power is flowing from power panel 406 to first load 410, control unit 1202 can select first load 410 as the POR. Whereas, if power is flowing from first load 410 to power panel 406, control unit 1202 can select power panel 406 as the POR. Other examples are also possible.

After determining the POR, control unit 1202 can regulate the system voltage based on a target voltage at the POR. For example, control unit 1202 can supply a direct current (DC) voltage to an exciter field of first generator 402 so that the output current or power of the generator is adjusted and the system voltage at the POR remains at a steady state value (e.g., 230 Vrms). As the load on the generator changes and the voltage at the POR responds accordingly, control unit 1202 can adjust the DC voltage supplied to the exciter field, thereby adjusting the output current or power of first generator 402 and helping to maintain a relatively constant voltage at the POR. Additionally or alternatively, control unit 1202 can regulate the system voltage by supplying a DC voltage to first generator 402 and also supplying a DC voltage to another exciter field of another generator, such as an exciter field of second generator 416 or an exciter field of third generator 418.

Control unit 1202 can determine the target voltage based on a desired voltage at one or more nodes. By way of example, control unit 1202 can determine the target voltage based on a minimum voltage limit and/or a maximum voltage limit of first load 410. Additionally, or alternatively, control unit 1202 can determine the target voltage based on a minimum voltage limit and/or a maximum voltage limit of second load 412. For instance, when first load 410 is in use, first load 410 could be the POR and control unit 1202 could determine a target voltage that is within a minimum voltage limit and a maximum voltage limit of first load 410. Likewise, when second load 412 is in use, second load 412 could be the POR and control unit 1202 could determine a target voltage that is within a minimum voltage limit and a maximum voltage limit of second load 412. Control unit 1202 could also determine a target voltage for a POR such that a first voltage at first load 410 remains within a minimum voltage limit and a maximum voltage limit of first load 410 and a second voltage at second load 412 remains within a minimum voltage limit and a maximum voltage limit of second load 412.

Control unit 1202 can be configured to regulate the system voltage based on a target voltage at a virtual POR. As an example, control unit 1202 can monitor a first voltage at first load 410 and monitor a second voltage at power panel 406. Control unit 1202 can then derive the voltage for a virtual POR using the first voltage and the second voltage (e.g., by averaging the first voltage and the second voltage), and regulate the system voltage based on the voltage for the virtual POR. For instance, control unit 1202 can adjust a DC voltage supplied to an exciter field of a generator so that the output current power of first generator 402 is appropriately adjusted and the voltage at the virtual POR remains relatively constant.

Figure 13:
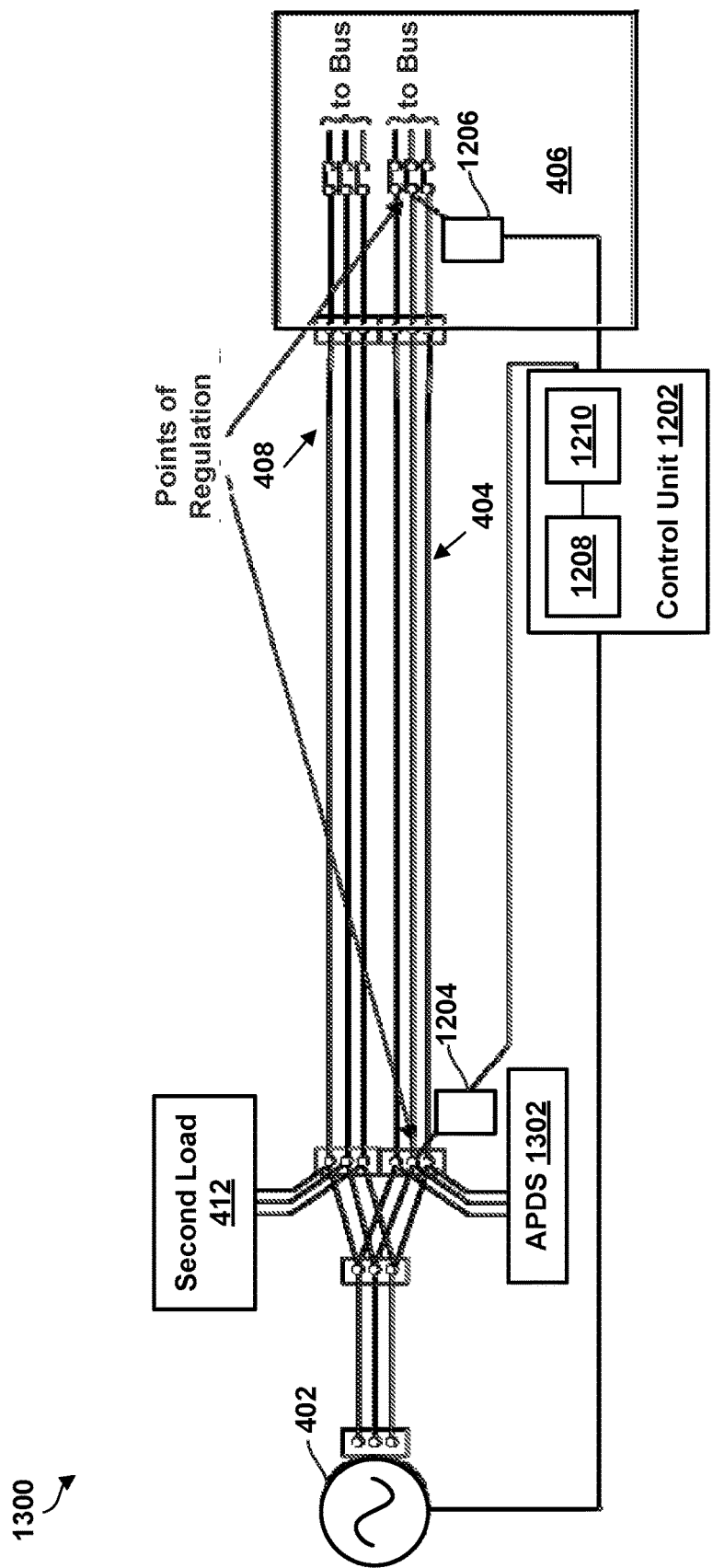
FIG. 13 shows another conceptual illustration of a technique for regulating a system voltage in the aircraft power distribution system of FIG. 4, according to an example.

FIG. 13 shows another conceptual illustration 1300 of a technique for regulating a system voltage in aircraft power distribution system 400 of FIG. 4, according to an example. Like conceptual illustration 1200 of FIG. 12, conceptual illustration 1300 includes control unit 1202, first sensing equipment 1204, and second sensing equipment 1206. Unlike conceptual illustration 1200, however, first sensing equipment 1204 is arranged to monitor a voltage at an aft power distribution system 1302. Aft power distribution system 1302 can be a power panel or other electrical system that is located at the back/tail region of an aircraft. Hence, the POR can be selected from either aft power distribution system 1302 or power panel 406.

In some examples, control unit 1202 can be configured to select either a first load or a second load as a POR, such as either first load 410 or second load 412 (not shown). For instance, control unit 1202 could receive data indicating whether the first load and/or the second load is in use, and be programmed to select, based on the received data, either the first load or the second load depending on which of the first load and the second load is in use.

Figure 14:
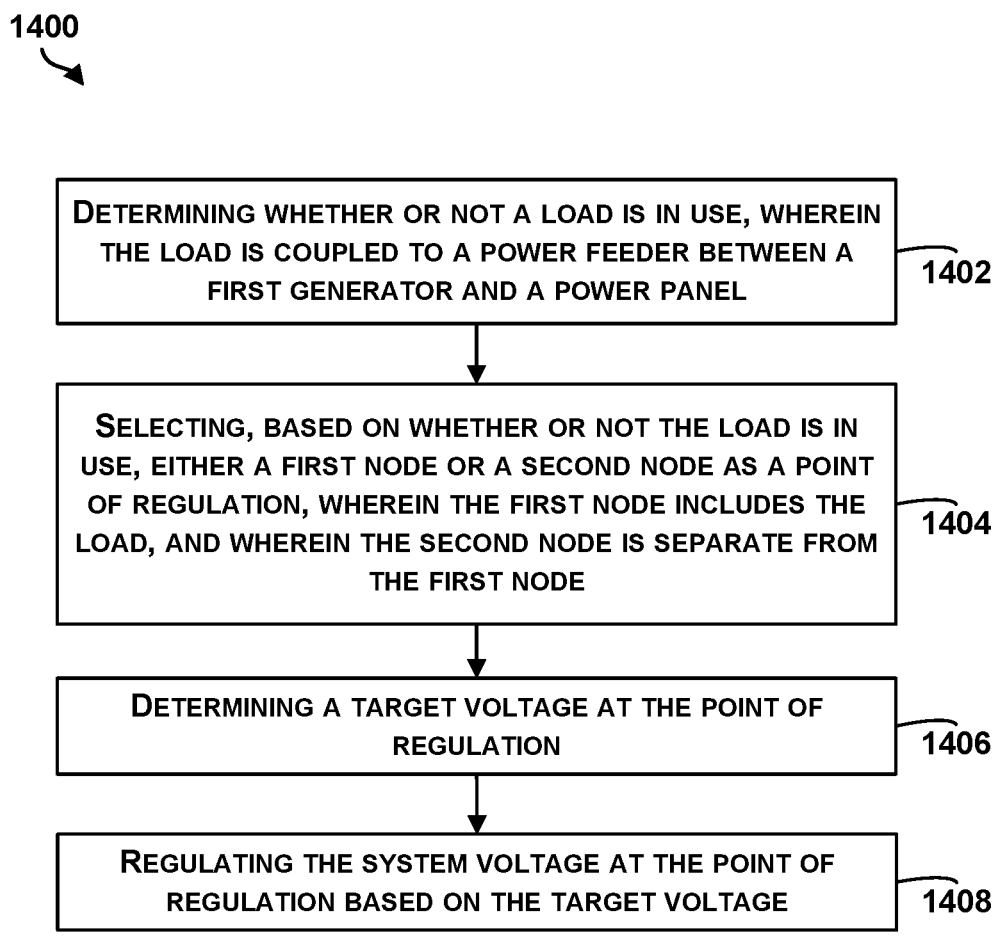
FIG. 14 shows a flowchart of a method, according to an example.

FIG. 14 shows a flowchart of an example method 1400. Method 1400 shown in FIG. 14 presents an embodiment of a method that, for example, could be used with aircraft power distribution system 400 of FIG. 4, for example, or any of the systems disclosed herein. Any of the example devices or systems described herein, such as control unit 1202 of FIGS. 12 and 13, may be used or configured to perform logical functions presented in FIG. 14.

Method 1400 may include one or more operations, functions, or actions as illustrated by one or more of blocks 1402-1408. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 1402, the method 1400 includes determining whether or not a load is in use. The load is coupled to a power feeder between a first generator and a power panel. In line with the discussion above, determining whether or not the load is in use could involve sensing a voltage at one or more nodes, determining which direction current or power is flowing in the power feeder, and/or determining the state of one or more contactors. The load could be a WIPS, an aft power distribution system, or another electrical system.

At block 1404, the method 1400 includes selecting, based on whether or not the load is in use, either a first node or a second node as a POR. The first node includes the load, and the second node is separate from the first node. For instance, the second node can be a power panel. In one example, selecting either the first node or the second node can involve selecting the first node based on the load being in use. Conversely, selecting either the first node or the second node can involve selecting the second node based on the load not being in use.

At block 1406, the method 1400 includes determining a target voltage at the POR. In line with the discussion above, sensing equipment, such as a voltage sensor coupled to a control unit, can be used to sense a voltage at the POR.

At block 1408, the method 1400 includes regulating the system voltage at the POR based on the target voltage. Regulating the system voltage can include adjusting an output current or power of the first generator so that the voltage at the POR is increased or decreased to the target voltage. For instance, a control unit can supply an appropriate DC current to an exciter field of the first generator. Optionally, the control unit can also supply an appropriate DC current to an exciter field of another generator.

Figure 15:
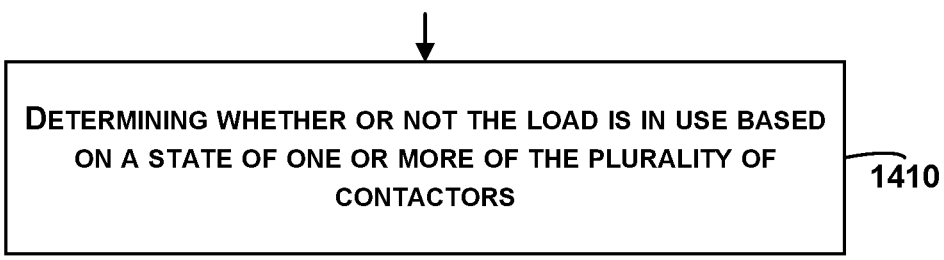
FIG. 15 shows an additional operation for use with the method shown in FIG. 14, according to an example.

FIG. 15 shows an additional operation for use with the method 1400 shown in FIG. 14, according to an example. Block 1410 of FIG. 15 could be performed as part of block 1402 of FIG. 14. For instance, block 1410 could be performed in an arrangement in which the aircraft power distribution system includes a plurality of contactors configured to vary a direction in which power is transferred in the power feeder.

At block 1410, FIG. 15 includes determining whether or not the load is in use based on a state of one or more of the plurality of contactors. In line with the discussion above, the plurality of contactors can include a load isolator positioned between the power feeder and the load. When the load isolator is closed, a control unit could interpret the state of the load isolator to mean that the load is in use. Whereas, when the load isolator contact is open, the control unit can interpret the state of the load isolator to mean that the load is not in use.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. An aircraft power distribution system, comprising:
   a first generator;
   a first power feeder coupled between the first generator and a power panel;
   a second power feeder coupled between the first generator and the power panel, the second power feeder coupled in parallel with the first power feeder;
   a first load coupled to the first power feeder;
   a second load coupled to the second power feeder; and
   a plurality of contactors,
   wherein each contactor of the plurality of contactors is connected to at least one of the first power feeder and the second power feeder, and
   wherein the plurality of contactors is configurable to:
      transfer power in a first direction from the first generator to both the first load and the second load during a first mode of operation, and
      transfer power in a second direction from the power panel to the first load or the second load during a second mode of operation, wherein, during the second mode of operation, the plurality of contactors are configured to simultaneously transfer power in the second direction from the power panel to the second load and transfer power in the first direction from the first generator to the first load.

2. The aircraft power distribution system of claim 1, wherein, during the second mode of operation, the plurality of contactors are configured to transfer power from a second generator to the first load or the second load by way of the power panel.

3. The aircraft power distribution system of claim 2, wherein the first generator is an auxiliary power unit generator and the second generator is an engine generator.

4. The aircraft power distribution system of claim 3, wherein the first load is a wing ice protection system.

5. The aircraft power distribution system of claim 3, wherein the first load is an aft power distribution system.

6. The aircraft power distribution system of claim 1, wherein the plurality of contactors are configured to transfer power in the second direction from the power panel to both the first load and the second load during a third mode of operation.

7. The aircraft power distribution system of claim 6, wherein, during the third mode of operation, the plurality of contactors are configured to transfer power from a second generator to both the first load and the second load by way of the power panel.

8. The aircraft power distribution system of claim 6, wherein, during the third mode of operation, the plurality of contactors are configured to transfer power from a second generator to the second load by way of the power panel and to transfer power from a third generator to the first load by way of the power panel.

9. The aircraft power distribution system of claim 1, further comprising a control unit configured to:
   select either the first load or the power panel as a point of regulation; and
   regulate a system voltage based on a target voltage at the point of regulation.

10. The aircraft power distribution system of claim 9, wherein the control unit is configured to:
    determine a state of one or more contactors of the plurality of contactors; and
    select the point of regulation based on the state of the one or more contactors.

11. The aircraft power distribution system of claim 9, wherein the control unit is configured to:
    determine which direction current or power is flowing in the first power feeder; and
    select the point of regulation based on the direction that current or power is flowing in the first power feeder.

12. An aircraft power distribution system, comprising:
    a first generator;
    a first power feeder coupled between the first generator and a power panel;
    a second power feeder coupled between the first generator and the power panel, the second power feeder coupled in parallel with the first power feeder;
    a first load coupled to the first power feeder;
    a second load coupled to the second power feeder;
    a plurality of contactors,
    wherein each contactor of the plurality of contactors is connected to at least one of the first power feeder and the second power feeder, and
    wherein the plurality of contactors is configurable to:
       transfer power in a first direction from the first generator to both the first load and the second load during a first mode of operation, and
       transfer power in a second direction from the power panel to the first load or the second load during a second mode of operation; and
    a control unit configured to:
       regulate a system voltage based on a first voltage at a first node when the first load is in use; and
       regulate the system voltage based on a second voltage at a second node when the first load is not in use.

13. The aircraft power distribution system of claim 9, wherein, during the second mode of operation, the plurality of contactors are configured to simultaneously transfer power in the second direction from the power panel to the second load and transfer power in the first direction from the first generator to the first load.

14. The aircraft power distribution system of claim 12, wherein, during the second mode of operation, the plurality of contactors are configured to transfer power from a second generator to the first load or the second load by way of the power panel.

15. The aircraft power distribution system of claim 14, wherein the first generator is an auxiliary power unit generator and the second generator is an engine generator.

16. The aircraft power distribution system of claim 12, wherein the plurality of contactors are configured to transfer power in the second direction from the power panel to both the first load and the second load during a third mode of operation.

17. The aircraft power distribution system of claim 16, wherein, during the third mode of operation, the plurality of contactors are configured to transfer power from a second generator to both the first load and the second load by way of the power panel.

18. The aircraft power distribution system of claim 16, wherein, during the third mode of operation, the plurality of contactors are configured to transfer power from a second generator to the second load by way of the power panel and to transfer power from a third generator to the first load by way of the power panel.

19. An aircraft power distribution system, comprising:
a first generator;
a first power feeder coupled between the first generator and a power panel;
a second power feeder coupled between the first generator and the power panel, the second power feeder coupled in parallel with the first power feeder;
a first load coupled to the first power feeder;
a second load coupled to the second power feeder;
a plurality of contactors,
wherein each contactor of the plurality of contactors is connected to at least one of the first power feeder and the second power feeder, and
wherein the plurality of contactors is configurable to:
transfer power in a first direction from the first generator to both the first load and the second load during a first mode of operation, and
transfer power in a second direction from the power panel to the first load or the second load during a second mode of operation; and
a control unit configured to:
monitor a first voltage at the first load and a second voltage at the power panel; and
regulate a system voltage based on the first voltage, the second voltage, or both.

20. The aircraft power distribution system of claim 19, wherein, during the second mode of operation, the plurality of contactors are configured to simultaneously transfer power in the second direction from the power panel to the second load and transfer power in the first direction from the first generator to the first load.

\* \* \* \* \*